United States Patent
Yoshida (10) Patent No.: US 6,525,841 B1
(45) Date of Patent: Feb. 25, 2003

(54) COMMUNICATION APPARATUS AND ITS CONTROL METHOD

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/294,369

(22) Filed: Apr. 20, 1999

(30) Foreign Application Priority Data

Apr. 22, 1998 (JP) .......................... 10-128197

(51) Int. Cl.[7] ................................ H04N 1/00
(52) U.S. Cl. .................... 358/400; 358/405; 358/406; 370/282; 370/287
(58) Field of Search ................ 358/400, 405, 358/406; 375/225; 370/278, 282, 287; 379/100.01, 100.06

(56) References Cited

U.S. PATENT DOCUMENTS

| | | | | |
|---|---|---|---|---|
| 4,729,033 A | * | 3/1988 | Yoshida | 358/257 |
| 4,814,894 A | * | 3/1989 | Yoshida | 358/298 |
| 4,829,524 A | * | 5/1989 | Yoshida | 371/32 |
| 4,885,755 A | * | 12/1989 | Yoshida | 375/58 |
| 5,031,179 A | | 7/1991 | Yoshida et al. | 371/32 |
| 5,172,246 A | | 12/1992 | Yoshida | 358/406 |
| 5,220,439 A | | 6/1993 | Yoshida | 358/404 |
| 5,267,052 A | | 11/1993 | Bannai et al. | 358/444 |
| 5,307,179 A | | 4/1994 | Yoshida | 358/440 |
| 5,438,427 A | * | 8/1995 | Yoshida | 358/405 |
| 5,671,270 A | | 9/1997 | Yoshida | 379/100 |
| 5,684,606 A | | 11/1997 | Yoshida | 358/437 |
| 5,721,731 A | * | 2/1998 | Yoshida | 370/296 |
| 5,726,765 A | | 3/1998 | Yoshida et al. | 358/412 |
| 5,748,334 A | | 5/1998 | Yoshida | 358/435 |
| 5,748,714 A | | 5/1998 | Yoshida | 379/100.06 |
| 5,890,806 A | | 4/1999 | Yoshida | 379/100.06 |
| 5,943,364 A | * | 8/1999 | Yoshida | 375/222 |

* cited by examiner

Primary Examiner—Jerome Grant, II
(74) Attorney, Agent, or Firm—Fitzpatrick, Cella, Harper & Scinto (57) ABSTRACT

A communication apparatus and its control method which assure an execution of a polling communication in a state that an ECM transmit inhibition is selected while an ECM receive inhibition is not selected for communications in the ITU-T Recommendation V.8, V.21, V.27ter, V.29, V.17, or V.34, by executing a V.17 or lower transmission without executing a V.34 transmission if the ECM transmit inhibition is selected, by executing a V.17 or lower reception without executing a V.34 reception if the ECM receive inhibition is selected, and by executing a V.8 protocol for a reception so as to execute a V.34 reception if it is a receive operation or to shift to a V.17 or lower polling transmission if it is a polling operation and executing a V.17 or lower transmission for a transmission in a state that the ECM transmit inhibition is selected while the ECM receive inhibition is not selected.

4 Claims, 8 Drawing Sheets

COMMUNICATION APPARATUS AND ITS CONTROL METHOD

BACKGROUND OF THE INVENTION

1. Field of the Invention

The present invention relates to a communication apparatus, particularly to a facsimile machine which enables a V.34 communication, and to its control method.

2. Related Background Art

Conventionally, in a facsimile machine which enables V.8 and V.34 communications, an ECM communication is requisite to the V.34 communication, and therefore a V.17 or lower transmission is executed if an ECM transmit inhibition is selected and a V.17 or lower reception is executed if an ECM receive inhibition is selected. (If the ECM transmission and the ECM reception are inhibited, a V.34 transmission is not executed.)

However, the above-described conventional apparatus has a disadvantage that, if an execution of a polling communication is received in a state that an ECM transmit inhibition is selected while an ECM receive inhibition is not selected, after transmitting an ANSam signal, receiving a CM signal, transmitting a JM signal, and receiving a CI signal (after an execution of a V.8 protocol) and further after transmitting a line probing signal, transmitting a long training, and exchanging parameters (after an execution of a V.34 protocol), a communication is disconnected, thus causing a disabled polling transmission since a V.34 data transmission is an ECM transmission and the ECM transmission is inhibited.

SUMMARY OF THE INVENTION

Therefore it is an object of the present invention to provide a communication apparatus and its control method which assure an execution of a polling communication in a state that an ECM transmit inhibition is selected while an ECM receive inhibition is not selected for communications in the International Telecommunication Union-Telecommunication (ITU-T) Recommendation V.8, V.21, V.27ter, V.29, V.17, or V.34.

DETAILED DESCRIPTION OF THE PREFERRED EMBODIMENTS

Figure 1:
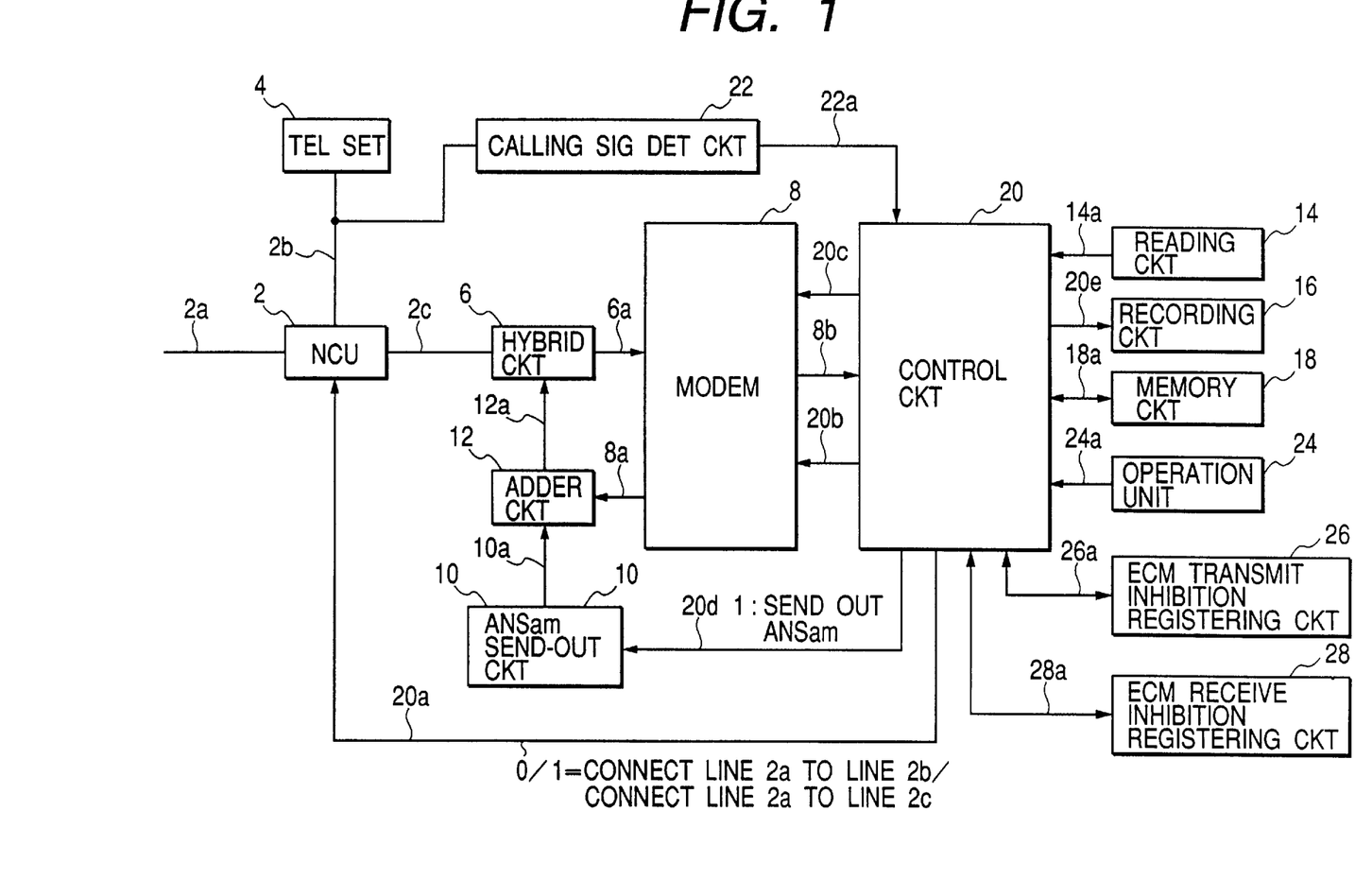
FIG. 1 is a block diagram illustrating an embodiment of the present invention.

Referring to FIG. 1, there is shown a block diagram of a configuration of a facsimile machine according to an embodiment of the present invention.

An NCU (network control unit) 2, which is connected to a terminal of a line in order to use a telephone network for data communication or the like, controls connections on the telephone switched network, switches to a data channel, or keeps a loop. In addition the NCU 2 connects a telephone line 2a to the side of a telephone set 4 if a signal from a control circuit 20 (a signal line 20a) is at the level 0, while it connects the telephone line 2a to the side of the facsimile machine if the signal is at the level 1. In a normal state, the telephone line 2a is connected to the side of the telephone set 4.

A hybrid circuit 6, which separates transmitted signals from received signals, sends out transmitted signals from an adder circuit 12 through the NCU 2 to the telephone line 2a and receives signals from the destination via the NCU 2 so as to transmit them to a modem 8 through a signal line 6a.

The modem 8 performs modulation and demodulation conforming to the ITU-T Recommendation V.8, V.21, V.27ter, V.29, V.17, and V.34, with each transmission mode designated according to a signal line 20c. This modem 8 inputs a signal which has been output to a signal line 20b, outputs modulated data to a signal line 8a, inputs a received signal which has been output to a signal line 6a, and outputs demodulated data to a signal line 8b.

An ANSam send-out circuit 10, which is a circuit for use in sending out an ANSam signal, sends out an ANSam signal to a signal line 10a if a signal at the signal level 1 is output to a signal line 20d and sends out no signal if a signal at the signal level 0 is output to the signal line 20d.

An adder circuit 12 inputs information on the signal line 8a and on the signal line 10a and outputs a result of an addition to a signal line 12a. A reading circuit 14 reads an image on a document sheet and outputs the read image data to a signal line 14a. A recording circuit 16 records information which has been output to a signal line 20e sequentially for each line. A memory circuit 18 is for use in storing raw information of read data or coded information or for use in storing received information or decoded information or the like.

A calling signal detection circuit 22, which is a circuit for use in detecting a calling signal, inputs a signal on a signal line 2b, and outputs a signal at the signal level 1 to a signal line 22a if it detects a calling signal; otherwise it outputs a signal at the signal level 0 to the signal line 22a.

An operation unit 24 has one-touch dialing keys, abbreviated dialing keys, a ten-key, * and # keys, polling-receive selection buttons, registration keys in circuits 26 and 28, and other function keys. Information of the depressed keys is output to a signal line 24a.

The registering circuit 26, which is for use in registering whether or not an ECM transmit inhibition should be selected, registers it via a signal line 26a.

A registering circuit 28, which is for use in registering whether or not an ECM receive inhibition is selected, registers it via a signal line 28a.

A control circuit 20 controls an entire facsimile machine in this embodiment which enables communications in the ITU-T Recommendation V.8, V.21, V.27ter, V.29, V.17, or V.34; specifically in this embodiment, it judges what states are registered in the above-mentioned registering circuits 26 and 28, by which if the ECM transmit inhibition is selected it executes a V.17 or lower transmission without executing a V.34 transmission while if the ECM receive inhibition is selected it executes a V.17 or lower reception without executing a V.34 reception, and if the ECM transmit inhibition is selected while the ECM receive inhibition is not selected, it executes the V.8 protocol for a reception so as to execute a V.34 reception if the registration is a receive operation or to shift to a V.17 or lower polling transmission if it is a polling operation and executes a V.17 or lower transmission for a transmission.

As for details of the reception, a V.8 ANSam signal is transmitted first. If a transmission is designated for a V.8 CM signal at detecting the V.8 CM signal, a V.8 JM signal is transmitted for indicating the V.34 communication being enabled and the control shifts to a receiving operation of a V.8 CJ signal and further of a V.34 line probing signal. If a polling reception is designated for the V.8 CM signal, a V.8 JM signal is transmitted for indicating the V.34 communication being disabled, and after a reception of the V.8 CJ signal, a V.21 DIS signal is transmitted for indicating the V.34 communication being disabled, and further after a reception of a V.21 DTC signal, a V.21 protocol is executed, and then V.17, V.29, or a V.27ter polling transmission (normal G3 mode (not ECM)) is executed.

Referring to FIGS. 2 to 8, there are shown flowcharts illustrating control flows of the control circuit 20.

Figure 2:
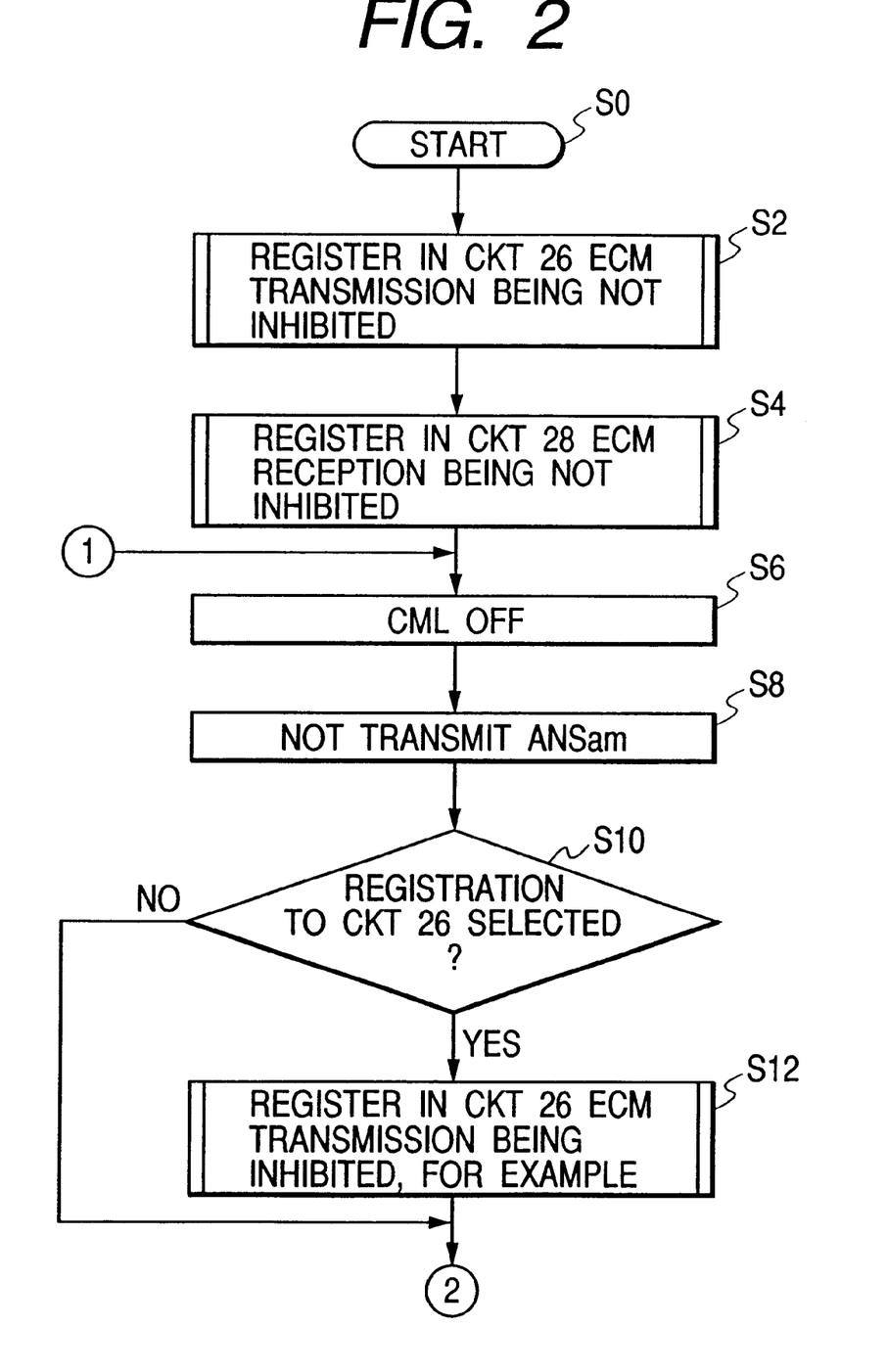
FIG. 2 is a flowchart illustrating an operation in the above-mentioned embodiment.
Figure 3:
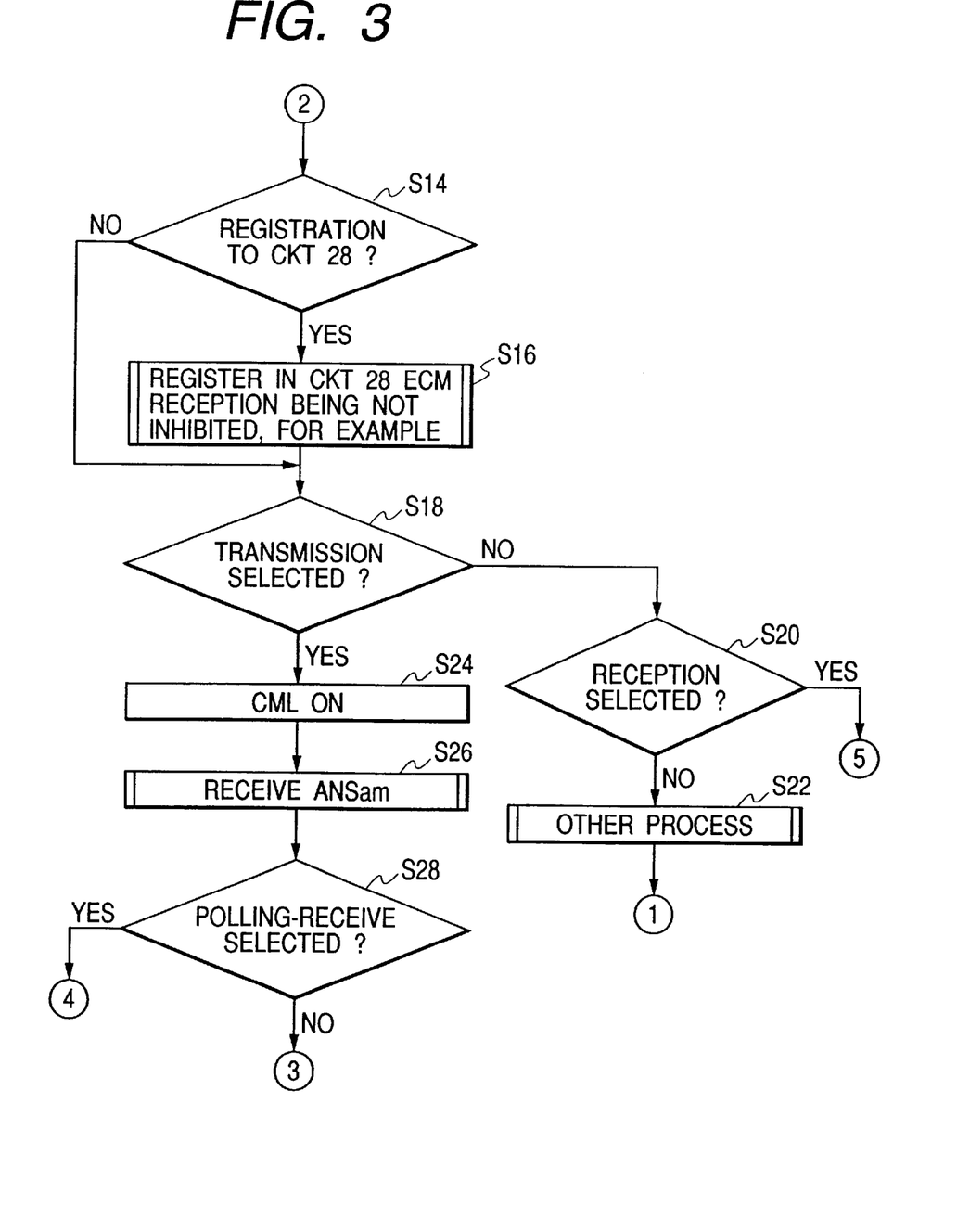
FIG. 3 is a flowchart illustrating an operation in the above-mentioned embodiment.
Figure 4:
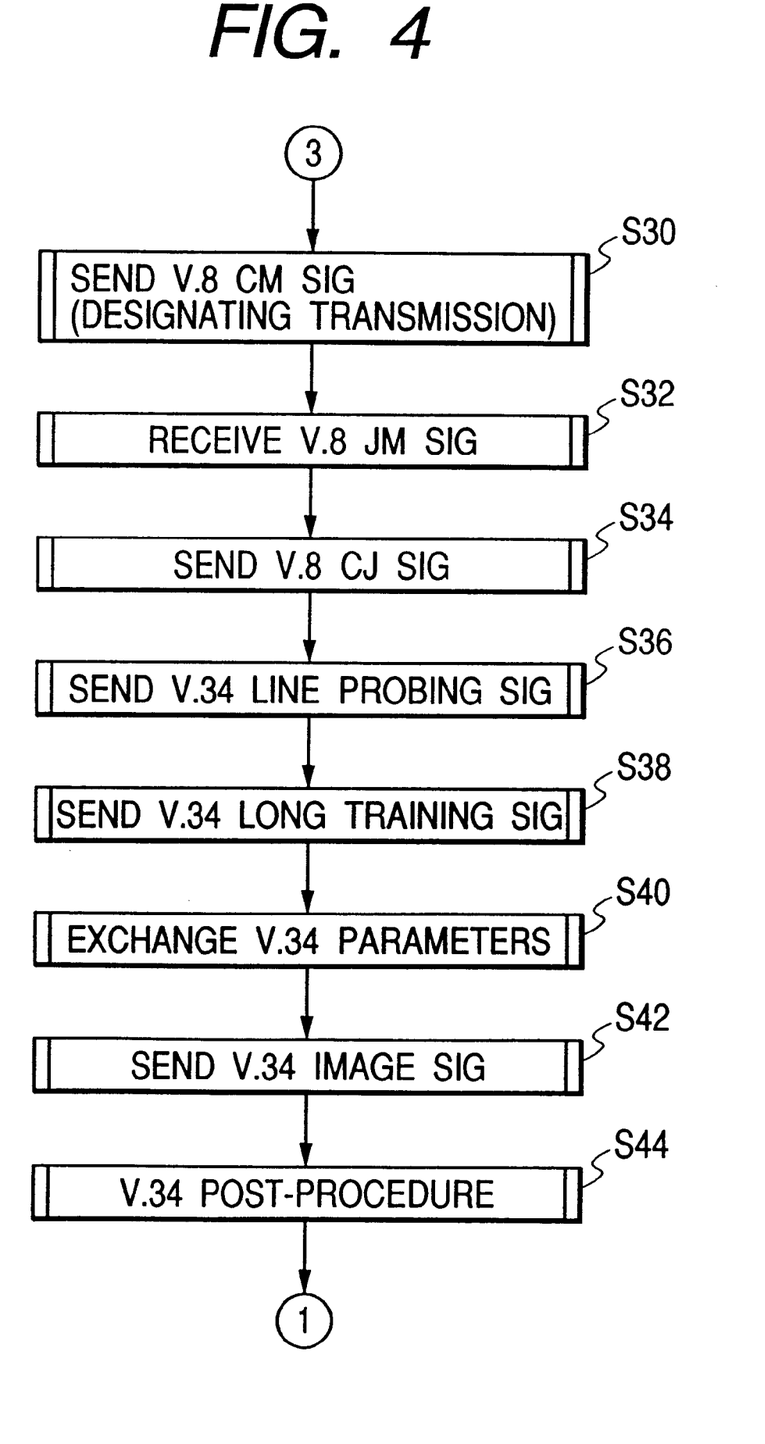
FIG. 4 is a flowchart illustrating an operation in the above-mentioned embodiment.
Figure 5:
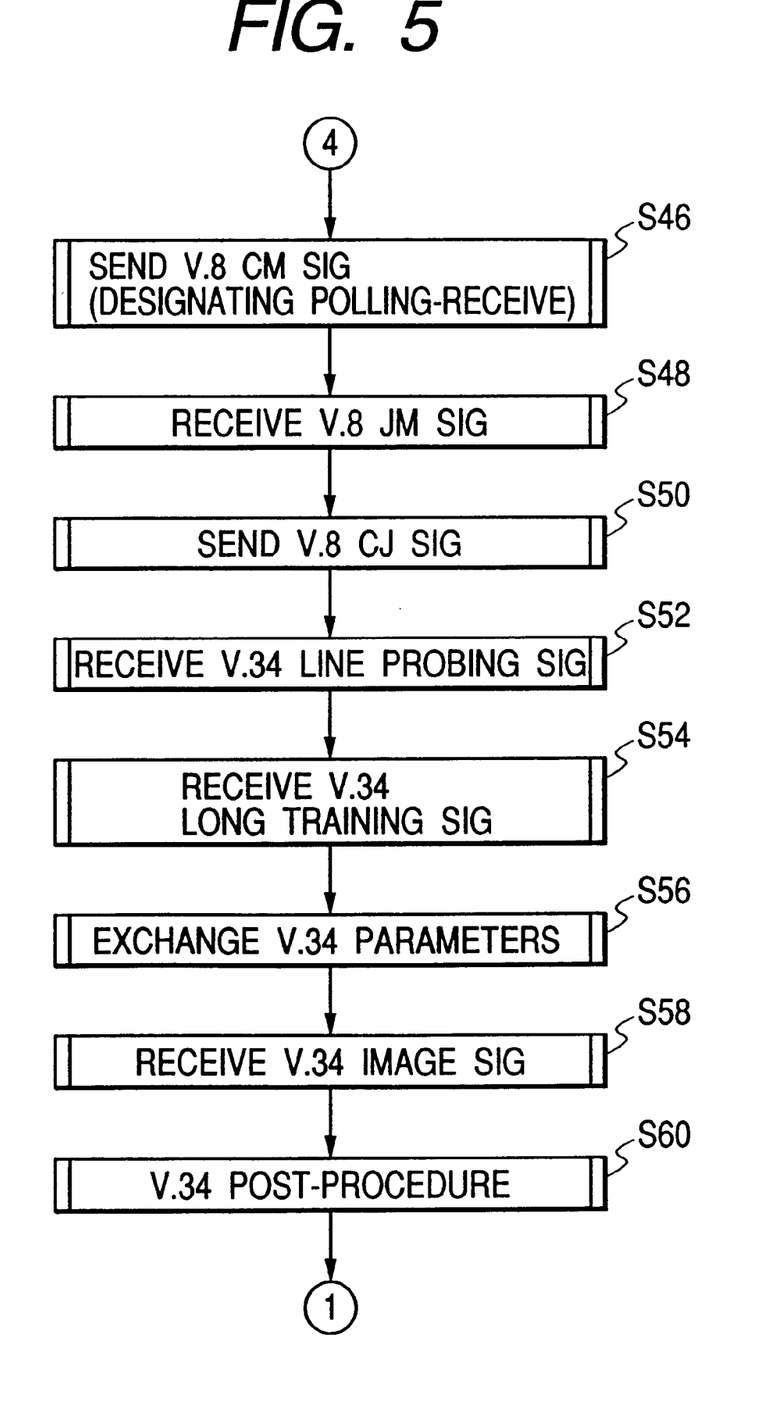
FIG. 5 is a flowchart illustrating an operation in the above-mentioned embodiment.
Figure 6:
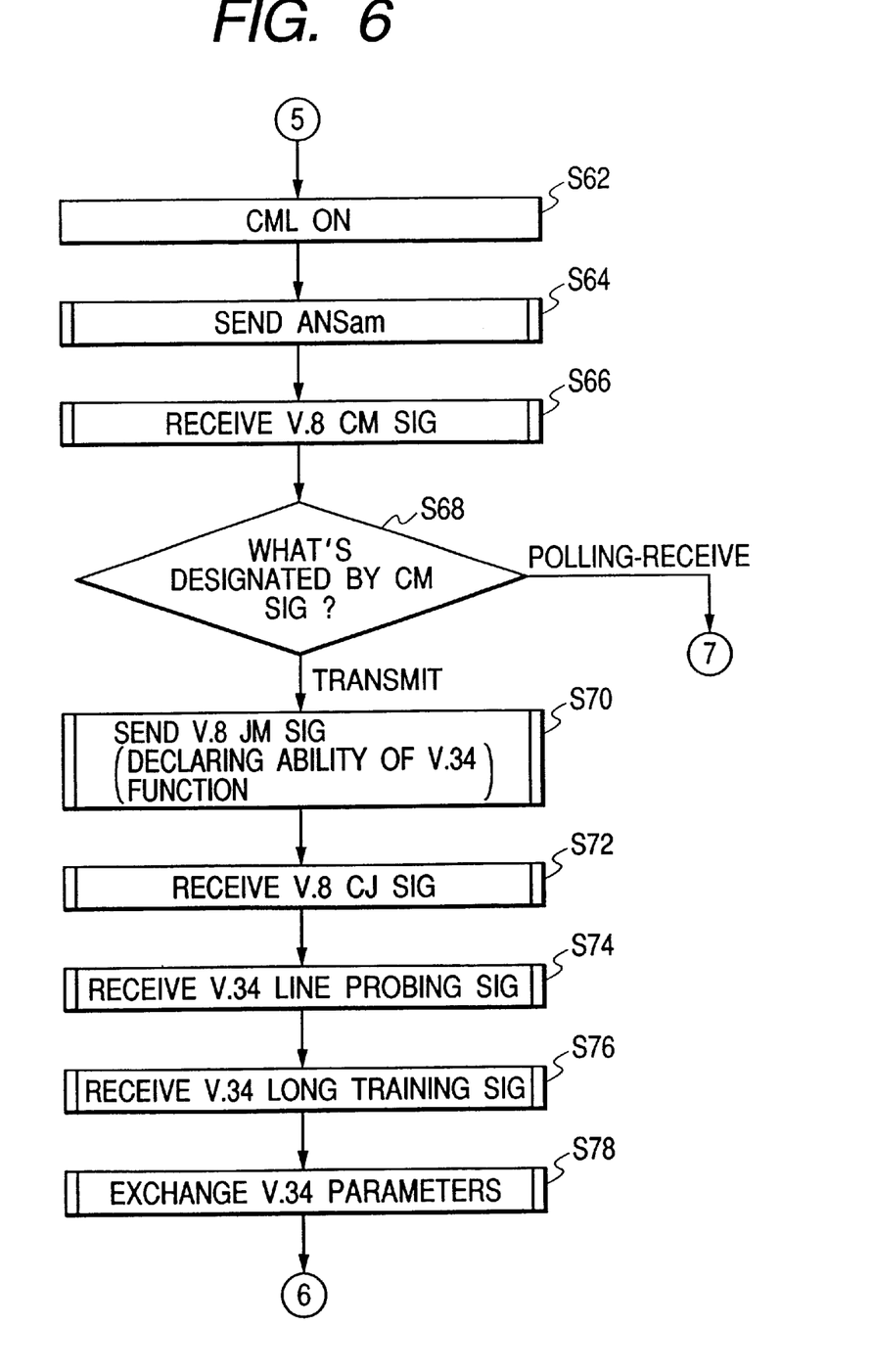
FIG. 6 is a flowchart illustrating an operation in the above-mentioned embodiment.
Figure 7:
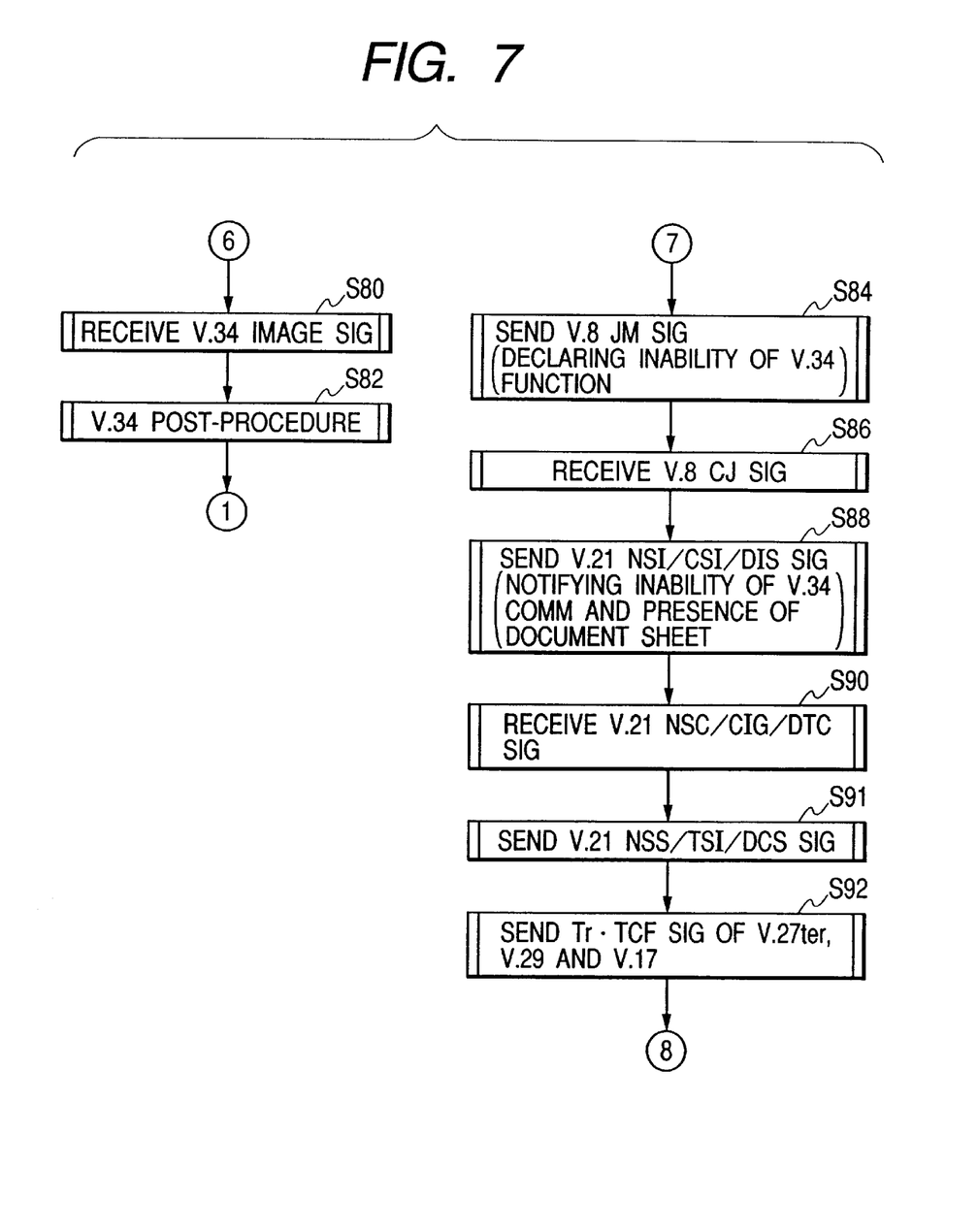
FIG. 7 is a flowchart illustrating an operation in the above-mentioned embodiment.
Figure 8:
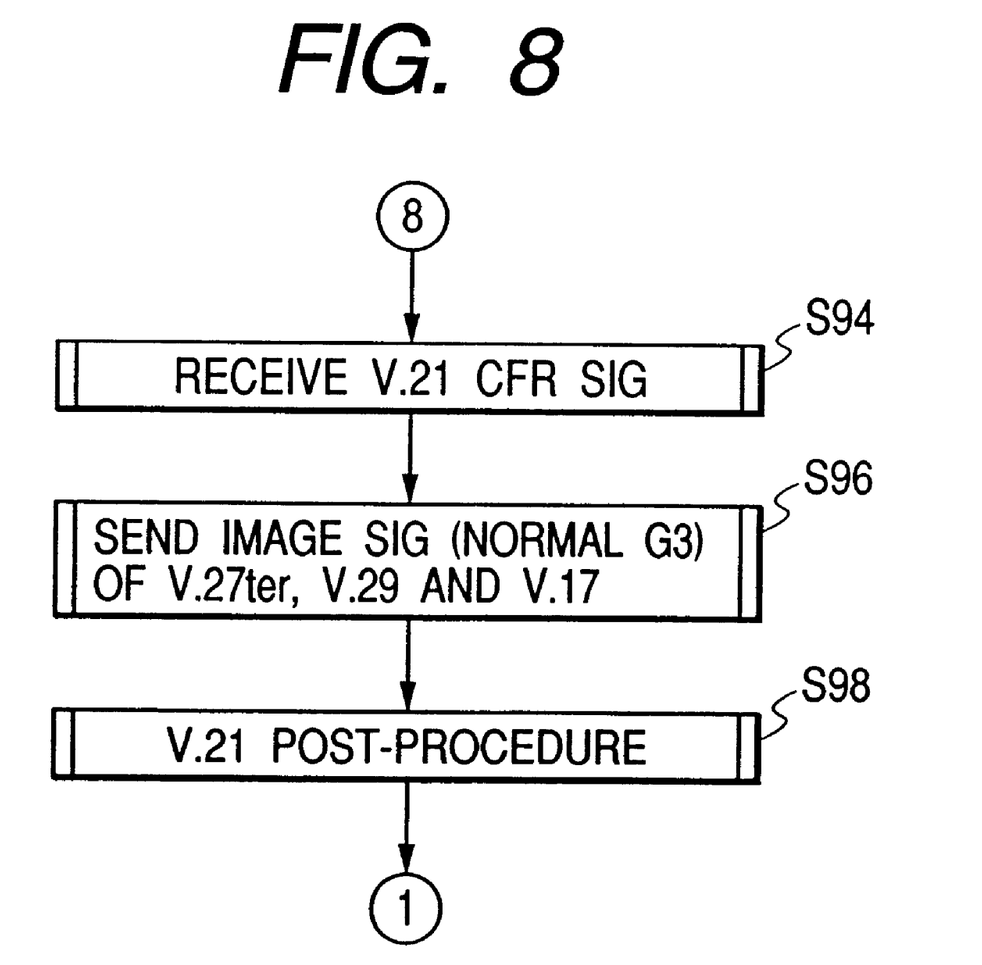
FIG. 8 is a flowchart illustrating an operation in the above-mentioned embodiment.

In FIG. 2, an operation is started in S0, and in S2 an ECM transmission being not inhibited is registered in the registering circuit 26 via a signal line 26a. In S4, an ECM reception being not inhibited is registered in the registering circuit 28 via a signal line 28a.

In S6, a signal at the signal level 0 is output to a signal line 20a to switch off the CML. In S8, a signal at the signal level 0 is output to the signal line 20d without sending out an ANSam signal.

In S10, information of a signal line 24a is entered and it is judged whether or not a registration in the registering circuit 26 is selected. If it is selected, the control progresses to S12 so as to register in the registering circuit 26 the ECM transmission being inhibited, for example, via the signal line 26a and then progresses to S14; otherwise, the control progresses to S14 directly.

In S14, information of the signal line 24a is entered and it is judged whether or not a registration in the registering circuit 28 is selected. If it is selected, the control progresses to S16 so as not to register in the registering circuit 28 the ECM reception being inhibited, for example, via the signal line 28a and then progresses to S18; otherwise, the control progresses to S18 directly.

In S18, information of the signal line 24a is entered and it is judged whether or not a transmission is selected. If it is selected, the control progresses to S24; otherwise, it progresses to S20 directly. In S20, information of the signal line 22a is entered and it is judged whether or not a reception is selected. If it is selected, the control progresses to S62; otherwise, it progresses to S22 for other processing.

In S24, a signal at the signal level 1 is output to the signal line 20a so as to switch on the CML. In S26, an ANSam signal is received. Further in S28, information of the signal line 24a is entered. If a polling reception is selected, the control progresses to S46; otherwise, it progresses to S30.

Next, sequential operations are performed such as sending V.8 CM signal designating a transmission in S30, receiving V.8 JM signal in S32, transmitting a V.8 CJ signal in S34, transmitting a V.34 line probing signal in S36, transmitting a V.34 long training signal in S38, exchanging V.34 parameters in S40, sending a V.34 image signal in S42, and performing V.34 post-procedure in S44. Afterward, the control progresses to S6.

Furthermore, such operations are performed as sending a V.8 CM signal designating polling reception in S46, receiving a V.8 JM signal in S48, sending a V.8 CJ signal in S50, receiving a V.34 line probing signal in S52, receiving a V.34 long training signal in S54, exchanging V.34 parameters in S56, receiving a V.34 image signal in S58, and performing a V.34 post-procedure in S60. Afterward, the control progresses to S6.

In S62, a signal at the signal level 1 is output to the signal line 20a so as to switch on the CML. In S64, sequential operations are performed such as sending an ANSam signal in S64 and receiving a V.8 CM signal in S66.

In S68, the content of the CM signal is analyzed. If a transmission is designated, the control progresses to S70. If a polling reception is designated, it progresses to S84.

Furthermore sequential operations are performed such as sending a V.8 JM signal declaring ability of a V.34 function in S70, receiving a CJ signal in S72, receiving a V.34 line probing signal in S74, receiving a V.34 long training signal in S76, exchanging V.34 parameters in S78, receiving a V.34 image signal in S80, and performing a V.34 post-procedure in S82. Then, the control progresses to S6.

Additionally sequential operations are performed such as sending a V.8 JM signal declaring inability of the V.34 function in S84 and receiving a CJ signal in S86. Furthermore, there are performed operations such as sending V.21 NSF/CSI/DIS signal declaring inability of a V.34 communication and the presence of a document sheet in S88, receiving a V.21 NSC/CIG/DTC signal in S90, sending a V.21 NSS/TSI/DCS signal in S91, sending a training TCF signal of V.27ter, V.29, and V.17 in S92, receiving a V.21 CFR signal in S94, sending an image signal of V.27ter, V.29, and V.17 (the normal G3 (not ECM)) in S96, and executing a V.21 post-procedure in S98. Then, the control progresses to S6.

While it has been particularly described that the control circuit operations described above is performed by a CPU in a control circuit based on a program stored in a ROM or RAM in the control circuit, according to the present invention this program may be stored in a floppy disk, a hard disk, an optical disk, a CD-ROM, further a memory card or other external storage mediums and be fetched into the control circuit by a dedicated reader, so that the program can be executed by the CPU in the control circuit.

Further in the above embodiment, while facsimile communications conforming to the ITU-T Recommendation V.8 and V.34, the present invention is applicable to various communication apparatuses conforming to communication protocols having the same kind of functions as for these recommendations.

Still further in the above embodiment, while the present invention has been described in connection with an example of a standalone-type facsimile machine, it is not limited to this. On the contrary, it is applicable to a data communication control in an integrated data processing system with its communication function combined with other functions such as a copying function, an electronic file function, and further data processing functions, for example. In addition, it is also applicable to a communication apparatus separated from a reading circuit or a recording circuit in the same manner.

As above described according to the present application, if a reception for a polling communication is executed in a state that an ECM transmit inhibition is selected while an ECM receive inhibition is not selected, it is possible to execute a polling transmission in an image transmission in the V.21, V.17, V.29, or V.27ter protocol after the V.8 protocol, thus providing an apparatus easy to use.

Further according to the present application, if a reception for a polling communication is executed in a state that an ECM transmit inhibition is selected while an ECM receive inhibition is not selected, it is possible to clarify detailed protocols, thus implementing properly a communication apparatus having this function.

What is claimed is:

1. A communication apparatus which enables communications in the ITU-T Recommendation V.8, V.21, V.27ter, V.29, V.17, and V.34, comprising:

a means for selecting an ECM transmit inhibition, and a means for selecting an ECM receive inhibition, wherein, if an ECM transmit inhibition and an ECM receive inhibition are selected, said communication apparatus executes a V.17 or lower transmission without executing a V.34 transmission and executes a V.17 or lower reception without executing a V.34 reception, and if the ECM transmit inhibition is selected while the ECM receive inhibition is not selected, it executes the V.8 protocol for a reception so as to execute a V.34 reception if it is a receive operation or to shift to a V.17 or lower polling transmission if it is a polling transmission so as to execute a V.17 or lower data transmission.

2. A communication apparatus according to claim 1, wherein a V.8 ANSam signal is transmitted for a reception, by which if a transmission is designated for a V.8 CM signal at detecting the V.8 CM signal, a V.8 JM signal is transmitted for indicating the V.34 communication being enabled, while if a polling reception is designated for said V.8 CM signal, a V.8 JM signal is transmitted for indicating the V.34 communication being disabled.

3. A communication method according to claim 1, wherein a V.8 ANSam signal is transmitted for a reception, by which if a transmission is designated for a V.8 CM signal at detecting the V.8 CM signal, a V.8 JM signal is transmitted for indicating the V.34 communication being enabled, while if a polling reception is designated for said V.8 CM signal, a V.8 JM signal is transmitted for indicating the V.34 communication being disabled.

4. A communication method in the ITU-T Recommendation V.8, V.21, V.27ter, V.29, V.17, and V.34, comprising the steps of:

selecting an ECM transmit inhibition; and selecting an ECM receive inhibition, wherein, if an ECM transmit inhibition and an ECM receive inhibition are selected, a V.17 or lower transmission is executed without executing a V.34 transmission and executes a V.17 or lower reception without executing a V.34 reception, and if the ECM transmit inhibition is selected while the ECM receive inhibition is not selected, it executes the V.8 protocol for a reception so as to execute a V.34 reception if it is a receive operation or to shift to a V.17 or lower polling transmission if it is a polling transmission so as to execute a V.17 or lower data transmission.

* * * * *